(12) United States Patent
Abraham et al.

(10) Patent No.: US 12,069,185 B1
(45) Date of Patent: Aug. 20, 2024

(54) SYSTEMS AND METHODS FOR A DATA INTEGRATION CONNECTOR

(71) Applicant: BlackRock, Inc., New York, NY (US)

(72) Inventors: Shaila Abraham, New York, NY (US); James Capps, New York, NY (US)

(73) Assignee: BlackRock, Inc., New York, NY (US)

( * ) Notice: Subject to any disclaimer, the term of this patent is extended or adjusted under 35 U.S.C. 154(b) by 206 days.

(21) Appl. No.: 17/947,838

(22) Filed: Sep. 19, 2022

Related U.S. Application Data

(60) Provisional application No. 63/255,831, filed on Oct. 14, 2021.

(51) Int. Cl.
| | |
|---|---|
| *H04L 9/32* | (2006.01) |
| *G06F 9/54* | (2006.01) |
| *G06F 21/64* | (2013.01) |
| *H04L 9/40* | (2022.01) |

(52) U.S. Cl.
CPC ............ *H04L 9/3247* (2013.01); *G06F 9/547* (2013.01); *G06F 21/64* (2013.01); *H04L 63/0281* (2013.01); *H04L 63/0876* (2013.01); *H04L 63/10* (2013.01); *H04L 63/105* (2013.01); *H04L 63/20* (2013.01)

(58) Field of Classification Search
CPC ... H04L 9/3247; H04L 9/3213; H04L 9/3242; H04L 9/0891; H04L 9/0819; H04L 63/10; H04L 63/083; H04L 63/062; H04L 9/50; H04L 63/0815; H04L 9/3218; H04L 9/0897; H04L 63/18; H04L 9/3239; H04L 63/0884; H04L 9/3263; H04L 63/20; H04L 9/321; H04L 41/18; H04L 63/105; H04L 41/28; H04L 63/102; G06F 21/6218; G06F 21/64; G06F 21/33; G06F 21/45; G06F 21/305; H04W 12/068; H04W 12/60; H04W 12/108; H04W 12/08; H04W 12/37; H04W 12/069
See application file for complete search history.

(56) References Cited

U.S. PATENT DOCUMENTS

| | | | |
|---|---|---|---|
| 8,296,320 B1 * | 10/2012 | Corbett | H04L 63/10 707/786 |
| 2016/0182525 A1 * | 6/2016 | Zhu | H04L 63/20 726/1 |
| 2021/0044976 A1 * | 2/2021 | Avetisov | G06F 21/64 |
| 2022/0239483 A1 * | 7/2022 | Sugarev | H04L 9/3247 |

* cited by examiner

*Primary Examiner* — Kyung H Shin
(74) *Attorney, Agent, or Firm* — Haynes and Boone, LLP (57) ABSTRACT

A universal cloud connector is proposed to intake client data using an integrated application programming interface (API) that is capable of processing various client data. Specifically, the integrated API includes at least two layers: (i) an authentication layer authenticates a client based on a client-level secret ID such that the client can only access data resource that is accessible to this particular client; (ii) a data segregation layer that integrates with the client's system so that users of the client (bank) can view and interact with their bank records that are pulled through the authentication layer. Thus, the integration API may act as a collection of micro-services that allow a client's system to synchronize data and workflow states with the server in real-time.

20 Claims, 11 Drawing Sheets

SYSTEMS AND METHODS FOR A DATA INTEGRATION CONNECTOR

CROSS REFERENCE(S)

The present application is a nonprovisional application of and claims priority under 35 U.S.C. 119 to U.S. provisional application No. 63/255,831, filed Oct. 14, 2021, which is hereby expressly incorporated by reference herein in its entirety.

TECHNICAL FIELD

The present application generally relates to data communication and intake between different servers, and more specifically to systems and methods for a data integration connector.

BACKGROUND

A financial institution such as BlackRock, Inc. needs to intake various financial data from a number of clients. This financial data may often have different data types and formats that are customized for each client. Traditionally, a specific data integration pipeline API is built for each client to intake the financial data. However, the scalability of this data intake pipeline is minimal as a pipeline API designed for a specific client can rarely be reused for another client.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for a data integration connector. Systems suitable for practicing methods of the present disclosure are also provided.

A universal cloud connector is proposed to intake client data using an integrated application programming interface (API) that is capable of processing various client data. Specifically, the integrated API includes at least two layers: (i) an authentication layer that authenticates a client based on a client-level secret ID such that the client can only access a data resource that is accessible to this particular client; (ii) a data segregation layer that integrates with the client's system so that users of the client (e.g., a bank) can view and interact with their bank records that are pulled through the authentication layer. Thus, the integration API may act as a collection of micro-services that allow a client's system to synchronize data and workflow states with the server in real-time.

In one embodiment, the integrated API maintains a queueing system such that various clients may sequentially send data requests to the financial institution server.

Figure 1:
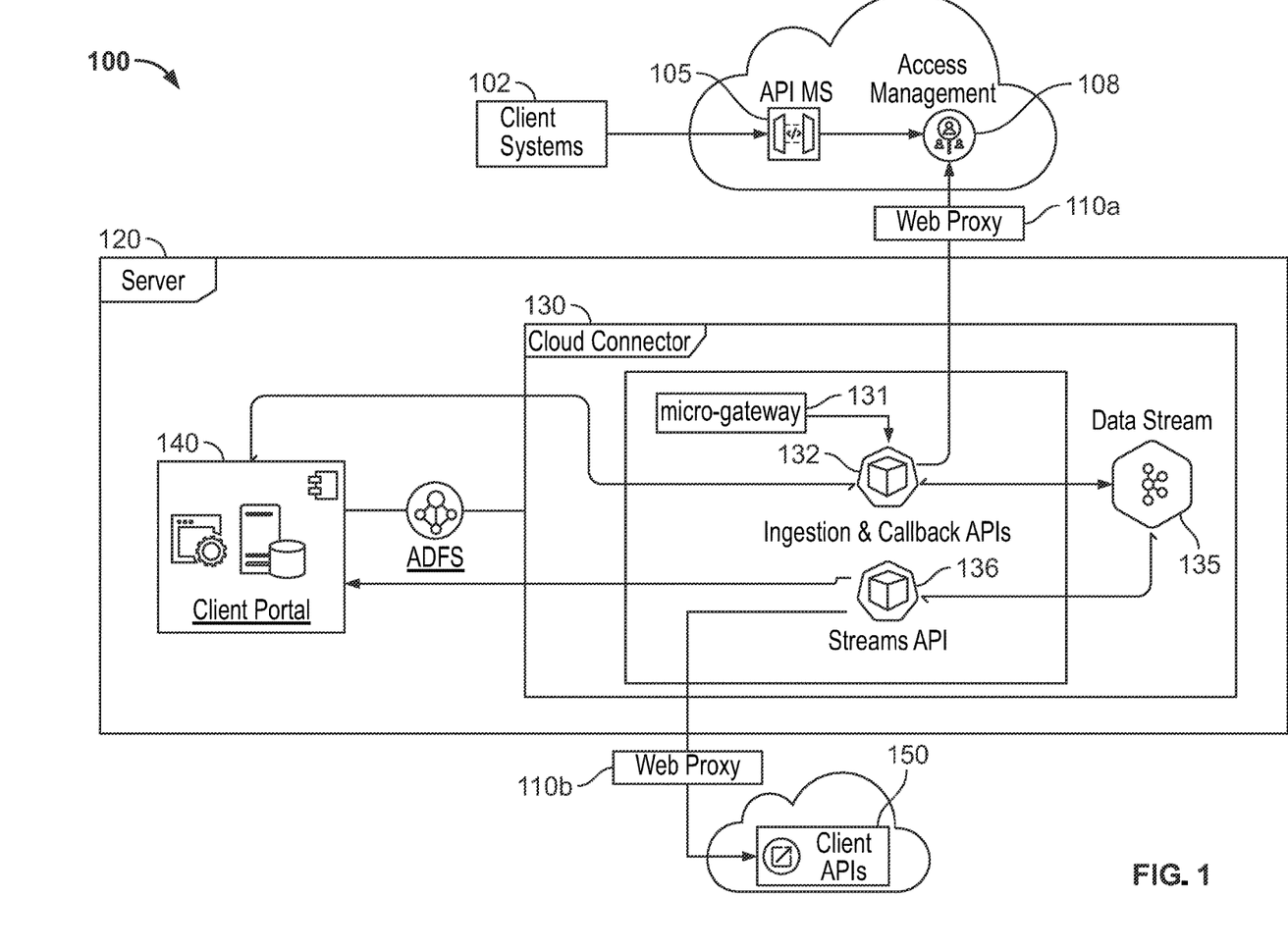
FIG. 1 is a simplified block diagram illustrating an example architecture of a cloud connector framework to intake data requests from client systems, according to one embodiment described herein.

FIG. 1 is a simplified block diagram 100 illustrating an example architecture of a cloud connector framework to intake data requests from client systems, according to one embodiment described herein. Diagram 100 shows one or more client systems 102, an API management system 105, an access management system 108, a server 120 hosting a cloud connector 130 and a client portal application 140, other outside client APIs 150 and/or other entities that interact with each other to provide data processing services.

In one embodiment, one or more client systems 102 may initiate a data request with the server 120. For example, the client system 102 may transmit an HTTP GET message containing a security token to the API management system 105, which may in turn forward the GET message for identity authentication to an access management system 108. Upon authenticating the security token from the GET message by the access management system 108, the client system 102 may then transmit an HTTP POST message containing the security token and the data request to the API management system 105, which may in turn pass on the data request to the cloud connector 130 at the server 120.

In one implementation, the data request may comprise any of a data synchronization request, a data processing exception handling request, an out-of-order record handling request, a data processing throughput control request, a trading request, and/or the like that originated from the client system 102. Different use cases of processing different data requests are discussed in relation to FIGS. 3-5B.

In one embodiment, the cloud connector 130 may be implemented as any combination of an API, a stream application, a service layer, a persistence layer, and/or the like. Further discussion of the structure of the cloud connector 130 can be found in relation to FIG. 7. At the cloud connector 130, a micro-gateway 131 may receive the data request from the API management system 105 and route the data request to the ingestion & callback APIs 132. The ingestion & callback APIs 132 then confirm identity authentication with the access management system 108, e.g., by transmitting an HTTP GET message containing a key to the system 108.

In one embodiment, depending on identity authentication with the access management system 108, the ingestion & callback APIs 132 may determine whether the data request shall be processed. For example, depending on the client system's access level, the ingestion & callback APIs 132 may determine whether a data synchronization request can be processed at all (e.g., whether the client system can access the requested data for synchronization), and/or an access level that is to be granted to the client system. For example, the client system may be granted partial access to a certain portion of data at the server 120 depending on the identity authentication with the access management system 108. The ingestion & callback APIs 132 may then send the data request to the data stream service 135.

In one implementation, data stream application 135 may adopt streams API 136 to process data streams. Each source topic in a stream topology has a corresponding processor (consumer) class. If a source topic is in multiple stream topologies, it could associate with different processor classes (different consumer groups). For example, a cc-account-complete topic is the sink topic for "Process Sync Request Stream" topology and source topic for "Process Pending Position Stream" topology.

In one embodiment, one or more client systems 102 may send data requests to the cloud connector 130 simultaneously, intermittently, or periodically. Thus, the cloud connector 130 may receive a number of data requests from a plurality of clients in a batch. The cloud connector 130 maintains and stores at, a queueing system at the connector 130, the number of data requests, and processes the number of data requests via asynchronous calls (as depicted by half arrows in diagram 100).

For example, the ingestion & callback APIs 132 may call client APIs to reach the client portal 140. Specifically, service authentication may be performed between the client portal 140 and the cloud connector 130, e.g., via active directory federation services (ADFS). Upon service authentication, the ingestion & callback APIs 132 may send a notice to the data stream service 135 to initiate the data stream processing. The data stream API 136 may then call a client API 150 via the web proxy to perform the corresponding data processing task. An API status from the client APIs 150 may then be updated with the client portal 140. On the other hand, the data stream API 136 may update the data processing status with the client portal 140 in real time.

Figure 2:
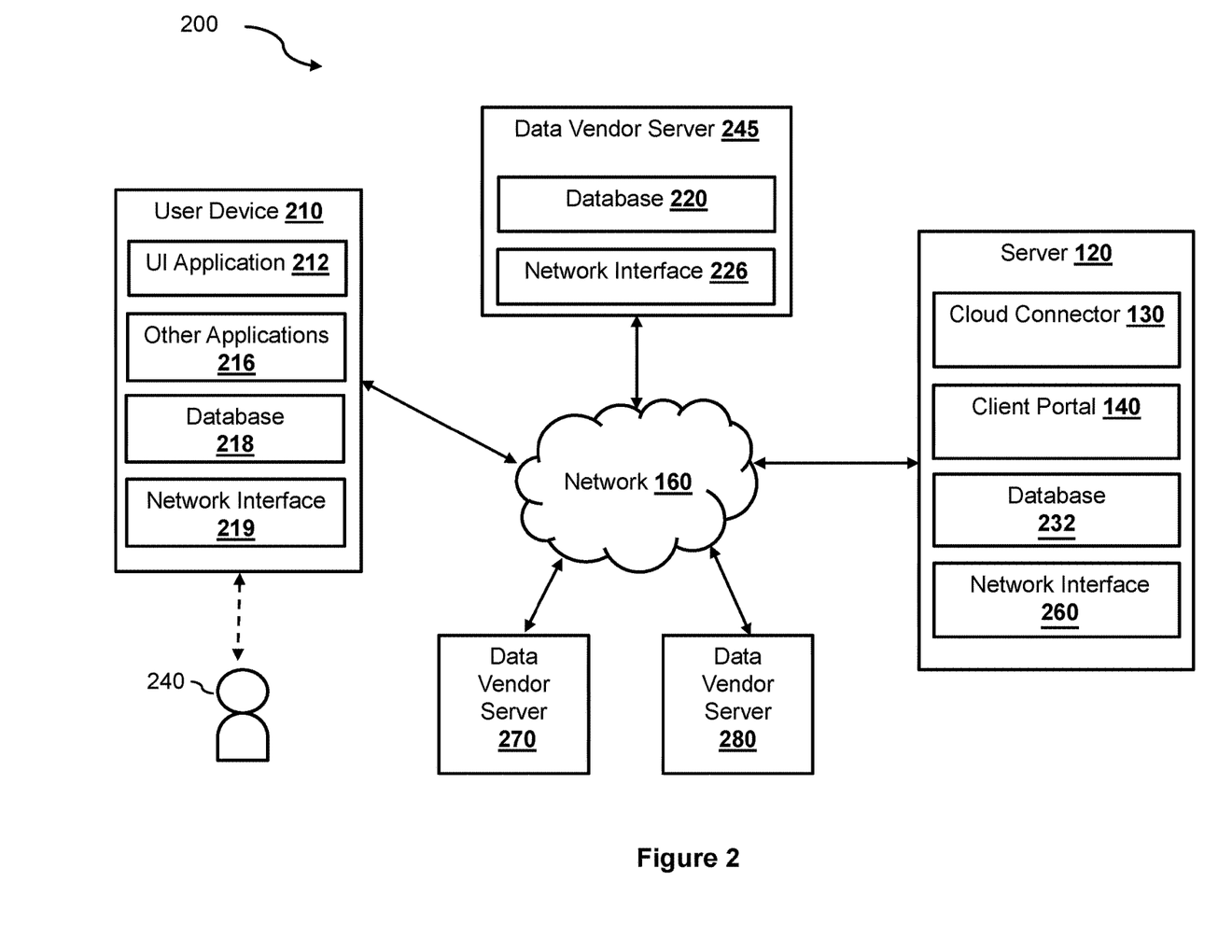
FIG. 2 is s simplified block diagram illustrating an example networked environment that the cloud connector framework described in FIG. 1 is implemented at, according to one embodiment described herein.

FIG. 2 is s simplified block diagram 200 illustrating an example networked environment that the cloud connector framework described in FIG. 1 is implemented at, according to one embodiment described herein. In one embodiment, block diagram 200 shows a system including a user device 210 which may be operated by a user 240, data vendor servers 245, 270 and 280, a server 120, and other forms of devices, servers, and/or software components that operate to perform various methodologies in accordance with the described embodiments. Exemplary devices and servers may include device, stand-alone, and enterprise-class servers which may be similar to the computing device 900 described in FIG. 9, operating an OS such as a MICROSOFT® OS, a UNIX® OS, a LINUX® OS, or another suitable device and/or server-based OS. It can be appreciated that the devices and/or servers illustrated in FIG. 2 may be deployed in other ways and that the operations performed, and/or the services provided by such devices and/or servers may be combined or separated for a given embodiment and may be performed by a greater number or fewer number of devices and/or servers. One or more devices and/or servers may be operated and/or maintained by the same or different entities.

The user device 210, data vendor servers 245, 270 and 280, and the server 120 may communicate with each other over a network 160. User device 210 may be utilized by user 240 (e.g., a driver, a system admin, etc.) to access the various features available for user device 210, which may include processes and/or applications associated with the server 120 to receive an output data anomaly report.

User device 210, data vendor server 245, and the server 120 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 200, and/or accessible over network 160.

User device 210 may be implemented as a communication device that may utilize appropriate hardware and software configured for wired and/or wireless communication with data vendor server 245 and/or the server 120. For example, in one embodiment, user device 210 may be implemented as an autonomous driving vehicle, a personal computer (PC), a smart phone, laptop/tablet computer, wristwatch with appropriate computer hardware resources, eyeglasses with appropriate computer hardware (e.g., GOOGLE GLASS®), other type of wearable computing device, implantable communication devices, and/or other types of computing devices capable of transmitting and/or receiving data, such as an IPAD® from APPLE®. Although only one communication device is shown, a plurality of communication devices may function similarly.

User device 210 of FIG. 2 contains a user interface (UI) application 212, and/or other applications 216, which may correspond to executable processes, procedures, and/or applications with associated hardware. For example, the user device 210 may receive a message indicating a data service processing confirmation (e.g., data synchronization completed, data exception report generated, etc.) from the server 120 and display the message via the UI application 212. In other embodiments, user device 210 may include additional or different modules having specialized hardware and/or software as required.

In various embodiments, user device 210 includes other applications 216 as may be desired in particular embodiments to provide features to user device 210. For example, other applications 216 may include security applications for implementing client-side security features, programmatic client applications for interfacing with appropriate application programming interfaces (APIs) over network 160, or other types of applications. Other applications 216 may also include communication applications, such as email, texting, voice, social networking, and IM applications that allow a user to send and receive emails, calls, texts, and other notifications through network 260. For example, the other application 216 may be an email or instant messaging application that receives a prediction result message from the server 120. Other applications 216 may include device interfaces and other display modules that may receive input and/or output information. For example, other applications 216 may contain software programs for asset management, executable by a processor, including a graphical user interface (GUI) configured to provide an interface to the user 240 to view the data service processing confirmation.

User device 210 may further include a database 218 stored in a transitory and/or non-transitory memory of user device 210, which may store various applications and data and be utilized during execution of various modules of user device 210. Database 218 may store user profile relating to the user 240, predictions previously viewed or saved by the user 240, historical data received from the server 120, and/or the like. In some embodiments, database 218 may be local to user device 210. However, in other embodiments, database 218 may be external to user device 210 and accessible by user device 210, including cloud storage systems and/or databases that are accessible over network 260.

User device 210 includes at least one network interface component 219 adapted to communicate with data vendor server 245 and/or the server 120. In various embodiments, network interface component 219 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Data vendor server 245 may correspond to a data server that hosts one or more of databases (or collectively referred to as 220) to provide datasets such as client data to the server 120. In one embodiment, the data vendor server 245 may be hosted by one or more client systems 102, or other external data vendor hosting client data. The database 220 may be implemented by one or more relational database, distributed databases, cloud databases, and/or the like.

The data vendor server 245 includes at least one network interface component 226 adapted to communicate with user device 210 and/or the server 120. In various embodiments, network interface component 226 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. For example, in one implementation, the data vendor server 245 may send asset information from the database 20, via the network interface 226, to the server 120.

The server 120 may be housed with the cloud connector module 130 and the client portal 140 described in FIG. 1. In some implementations, module 130 may receive data from database 220 at the data vendor server 245 via the network 260 to complete a data processing request. The generated a data service processing confirmation may also be sent to the user device 210 for review by the user 240 via the network 260.

The database 232 may be stored in a transitory and/or non-transitory memory of the server 120. In one implementation, the database 232 may store data obtained from the data vendor server 245. In one implementation, the database 232 may store parameters of the cloud connector model 130. In one implementation, the database 232 may store a previously generated data service processing confirmation, and the corresponding input feature vectors.

In some embodiments, database 232 may be local to server 120. However, in other embodiments, database 232 may be external to the server 120 and accessible by the server 120, including cloud storage systems and/or databases that are accessible over network 260.

The server 120 includes at least one network interface component 260 adapted to communicate with user device 210 and/or data vendor servers 245, 270 or 280 over network 260. In various embodiments, network interface component 260 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 260 may be implemented as a single network or a combination of multiple networks. For example, in various embodiments, network 260 may include the Internet or one or more intranets, landline networks, wireless networks, and/or other appropriate types of networks. Thus, network 260 may correspond to small scale communication networks, such as a private or local area network, or a larger scale network, such as a wide area network or the Internet, accessible by the various components of system 200.

Figure 3:
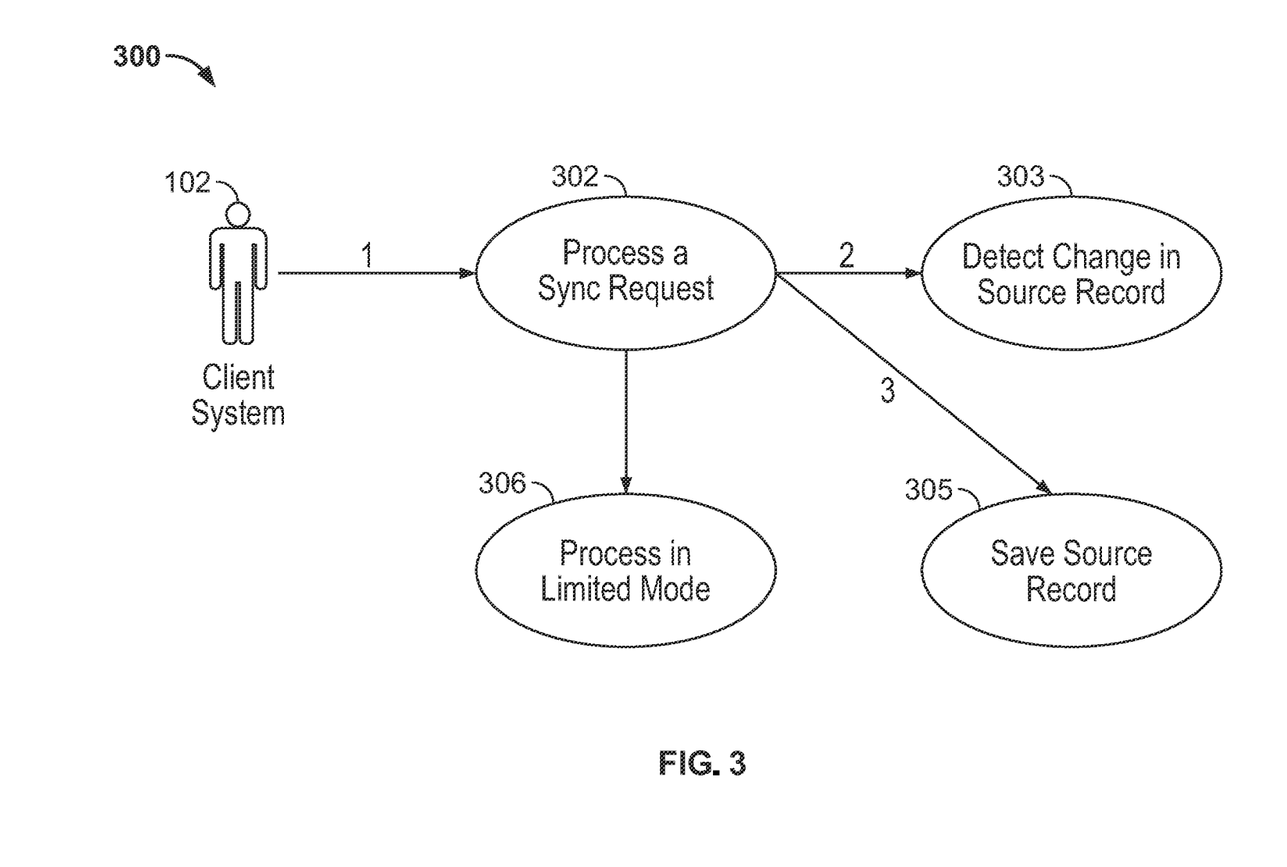
FIG. 3 is a simplified block diagram illustrating a use case of the cloud connector framework described in FIG. 1 for processing a data synchronization request, according to embodiments described herein.

FIG. 3 is a simplified block diagram illustrating a use case 300 of the cloud connector framework described in FIG. 1 for processing a data synchronization request, according to embodiments described herein. The use case 300 may be implemented at a bank system, which uses the cloud connector 130 to synchronize data records with their client portal.

For example, a client system 102 may send a synchronization request to the cloud connector 130, e.g., via an API 105. The cloud connector 130 may then process the synchronization request comprising one or more data records at step 302, by comparing the source record with the record with the same key that has been stored in the portal to detect any change in the source at step 303. At step 305, the cloud connector 130 may save the source record by inserting, updating, or deleting the previously stored record with the same key in the portal based on changes detected in Step 303.

In one implementation, the cloud connector 130 may run either in Full or Limited Processing mode (e.g., at step 306). The full mode (e.g., steps 303 and 305) uses the data stream service 135 to provide scalability, high performance, and fault tolerance to the API client. However, when the data stream service 135 is not available for an unpredictable period, the connector 130 may run in a limited mode, which adopts single threaded processing and synchronous API calls with the client portal 140. For multi-table updates, the connector may perform the update within a single transaction scope.

In one implementation, the cloud connector 130 may take a form as a collection of collaborating microservices. Each synchronization request is designated with a unique identifier. Processing steps across microservices are logged for each request. A combination of the unique identifier and timestamp is the primary key in the log. In this way, a monitoring system can observe or assemble the full journey of a synchronization request through different services from the log.

Figure 4:
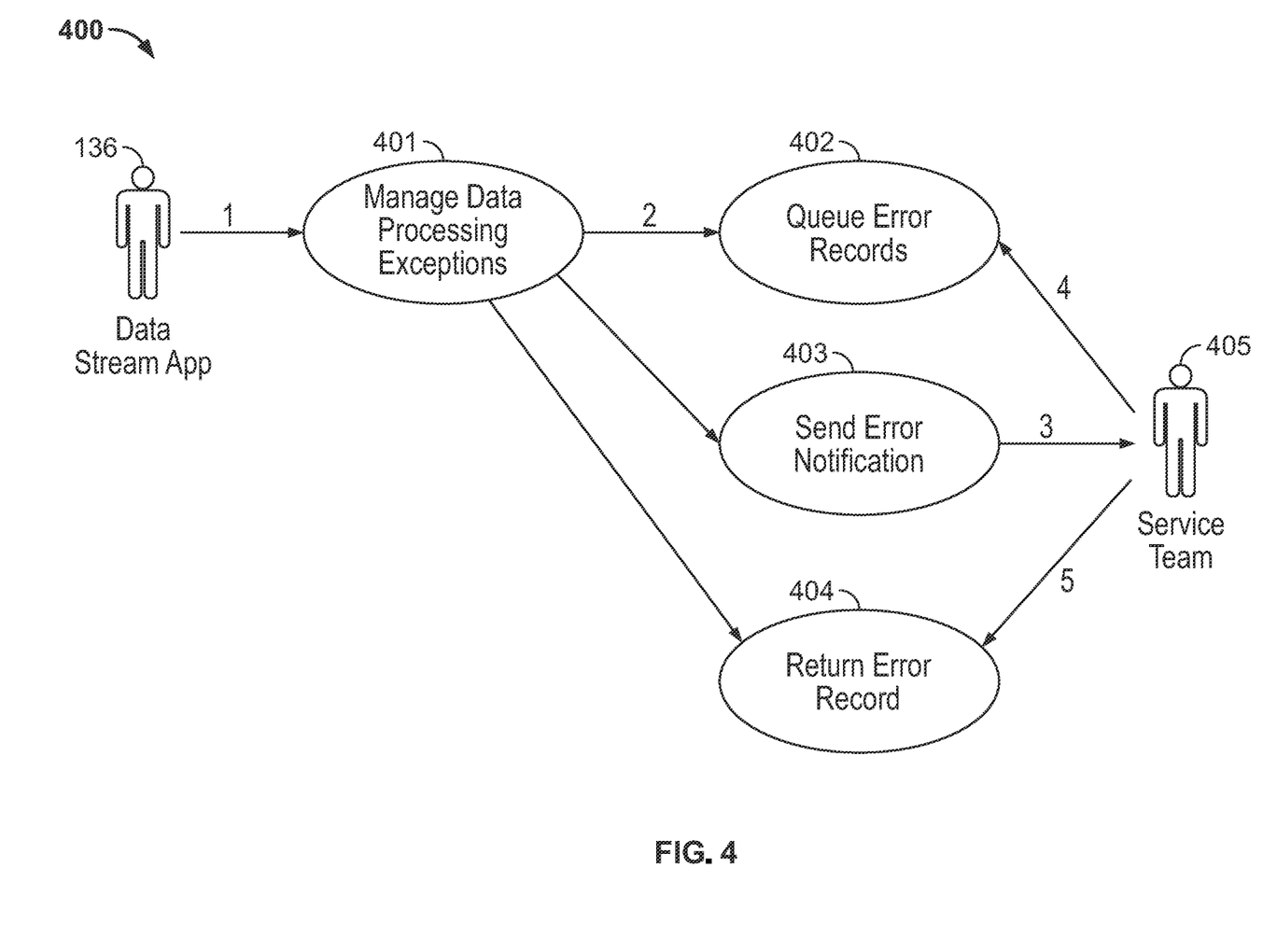
FIG. 4 is a simplified block diagram illustrating a use case of the cloud connector framework described in FIG. 1 for managing data processing exceptions, according to embodiments described herein.

FIG. 4 is a simplified block diagram illustrating a use case 400 of the cloud connector framework described in FIG. 1 for managing data processing exceptions, according to embodiments described herein. The cloud connector 130 implements a data processing exception mechanism to ensure fault tolerance. For example, when exceptions occur during processing, the data stream application 136 may initiate the data process exception procedure at step 401. The error synchronization request is then put on a dedicated queue for error handling, e.g., at step 402. An error notification is then sent to the service team 405, e.g., at step 403. The synchronization request provides error details for issue resolution. Upon resolution, the service team 405 can rerun the synchronization request by sending the error synchronization request back to the original processing topic/queue, e.g., at step 404.

In one implementation, as the cloud connector 130 is a real-time system, the order of inbound messages is not required to be strictly defined. Thus, the connector 130 may handle an out-of-order scenario, e.g., when a child record arrives before the parent record.

In one implementation, the connector 130 may use the data stream application 136 to scale data processing throughput by partition topics so that records on different partitions can be processed in parallel, therefore achieving scalability. As data records on a partition are processed sequentially by its designated thread, the data stream processing is also used to throttle inbound messages from overrunning downstream systems.

Figure 5A:
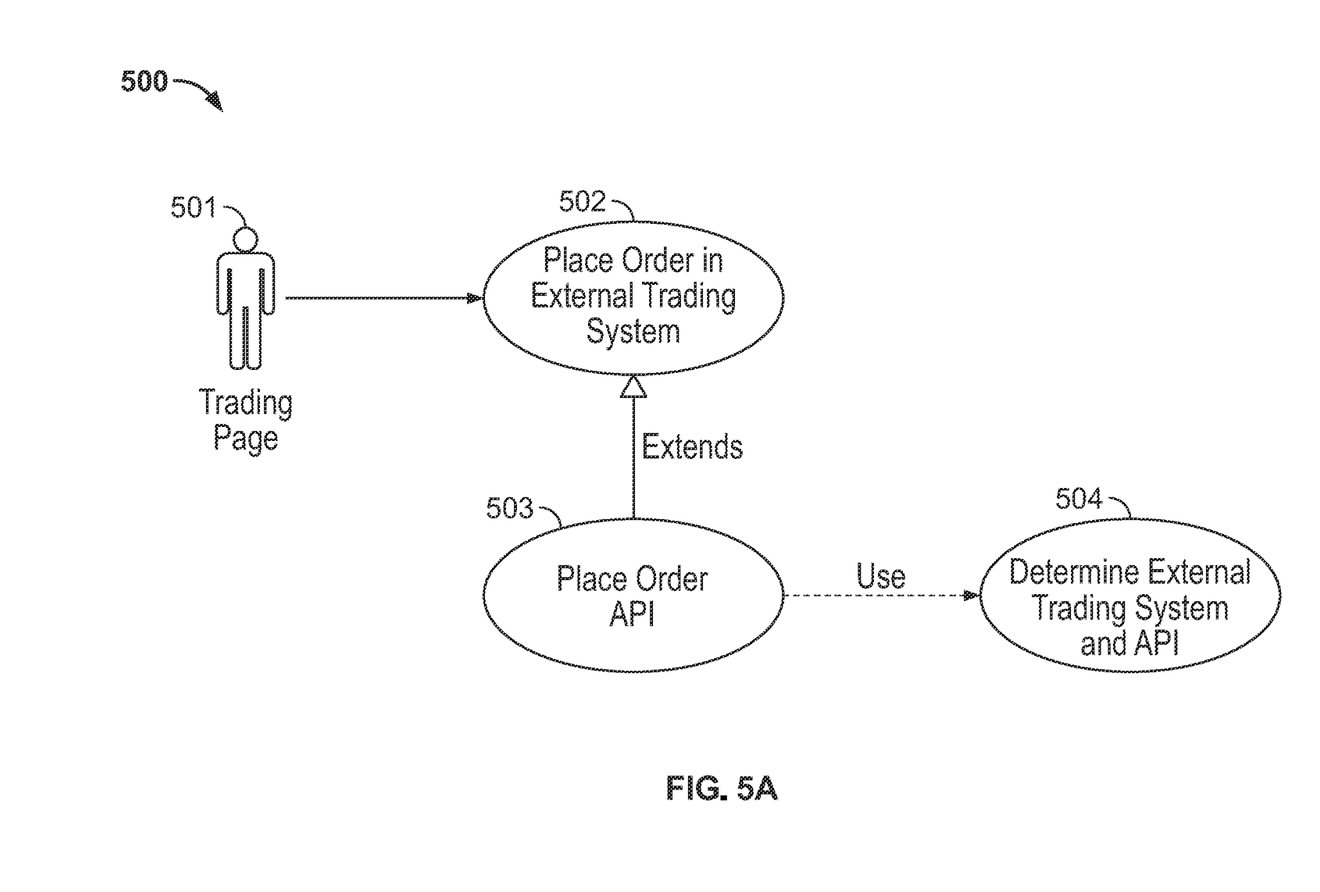
FIG. 5A is a simplified block diagram illustrating a use case of the cloud connector framework described in FIG. 1 for generating a trading order, according to embodiments described herein.

FIG. 5A is a simplified block diagram illustrating a use case 500 of the cloud connector framework described in FIG. 1 for generating a trading order, according to embodiments described herein. In one implementation, the client portal 140 may host or be communicative coupled to a trading page 501. For example, a user may submit a trading order from a browser (displaying the trading page 501) to a web server for an external trading system, e.g., at step 502, and the browser may receive acknowledgement for successful order submission. The cloud connector 130 may determine the service provider (e.g., which external trading system and API the order shall be routed to) by attributes of the submitted order, e.g., at step 504. The cloud connector 130 may call the web API by the service provider to place the order at step 503 and may then return the order submission status to the trading page 501.

In one implementation, the trading page 501 (client portal 140) may fail to call the cloud connector 130, and as a result the connector 130 may not look up the service provider. The call to service provider may be deemed failed and return a failure report to the user via the trading page 501.

Figure 5B:
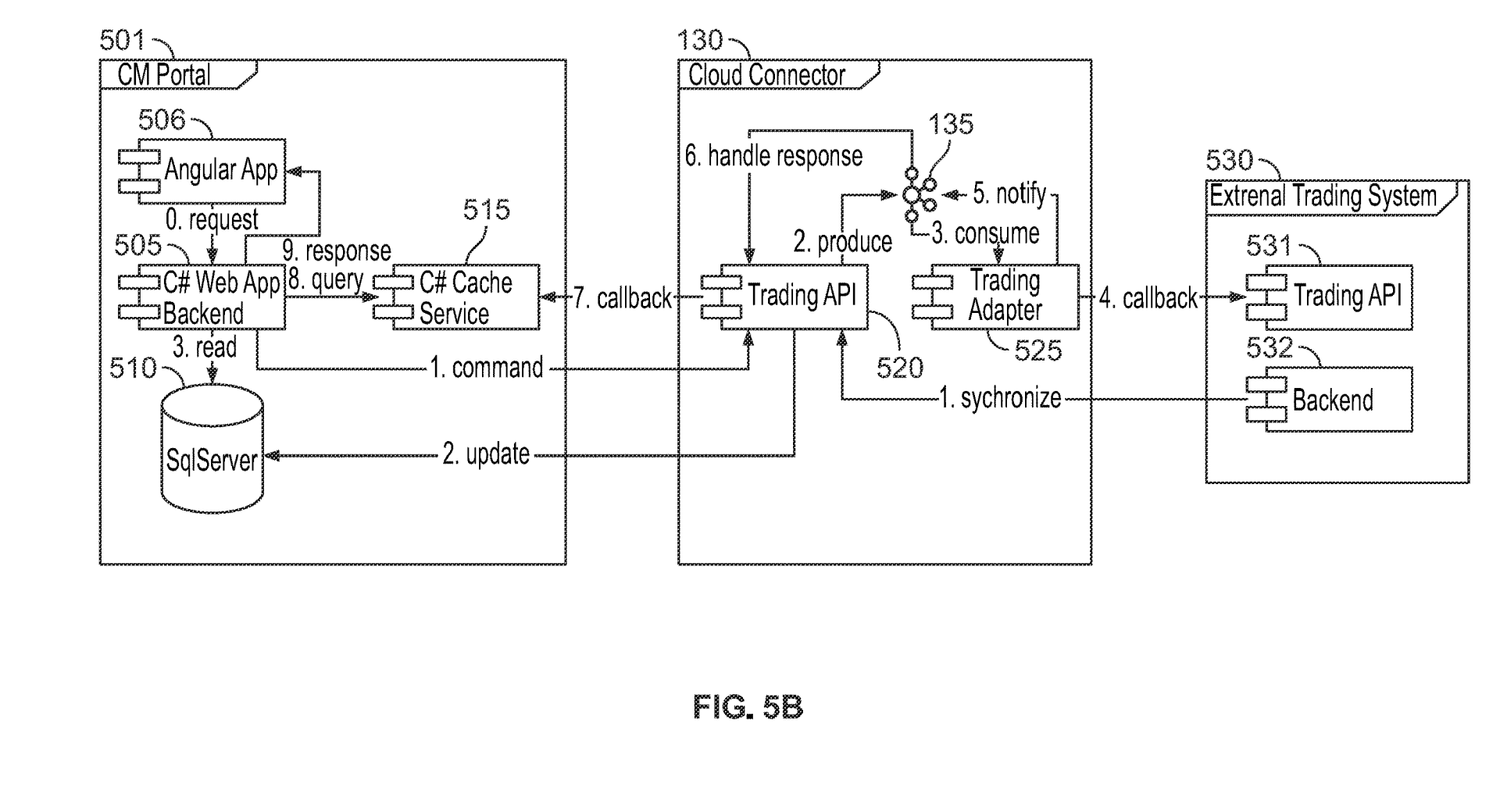
FIG. 5B is a simplified block diagram illustrating an example system flow for the use case described in FIG. 5A, according to embodiments described herein.

FIG. 5B is a simplified block diagram illustrating an example system flow for the use case described in FIG. 5A, according to embodiments described herein. The client portal (training page) 501 may comprise an angular application 506, a web application backend 505 and a cache service application 515. The cloud connector 130 may include a trading API 520 and a trading adapter 525. An external trading system 530 may include a trading API 531 and a backend system 532.

In one embodiment, at the user side, upon submitting a trading order via the user interface, the angular application 506 may send a trading request to the web application backend 505, which may in turn send the trading command to the trading API 520 at the connector 130. The trading API 520 may then produce a data processing request to the data stream application 135 for data consumption at the trading adapter 525. The trading adapter 525 may then call the trading API 531 at the trading system side to initiate the execution of the trading order.

Upon calling the trading API 531, the trading adapter 525 may also send a notification to the data stream application 135 that the trading order has been sent out to the external system. The data stream application 135 may then generate and send a response to the trading API 520, which in turn forward the response to a cache service 515 at the portal 501. Thus, the web application backend 505 may query the cache service 515 for a status update of the trading request.

In another embodiment, the backend 532 of the external trading system 530 may synchronize with the trading API 520 at the cloud connector 130. The trading API 520 may then update a SQL server 510 at the portal 501 with the status of previously submitted trading orders. In this way, the web application backend 505 may read the status update from the SQL server 510.

Figure 6:
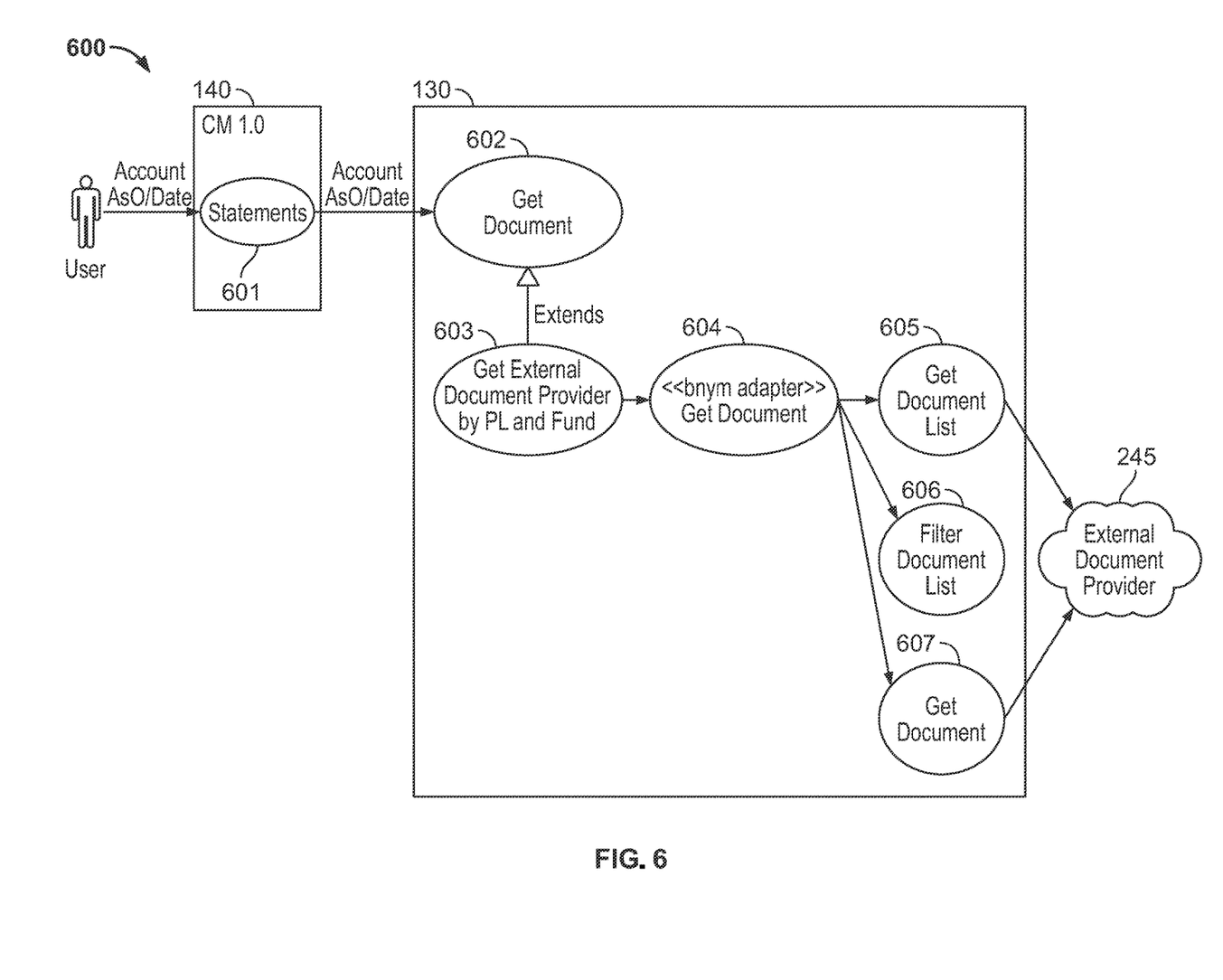
FIG. 6 is a simplified block diagram illustrating a use case of the cloud connector framework described in FIG. 1 for retrieving and managing external documents, according to embodiments described herein.

FIG. 6 is a simplified block diagram illustrating a use case 600 of the cloud connector framework described in FIG. 1 for retrieving and managing external documents, according to embodiments described herein. A user, such as user 240 in FIG. 2, may request a document based on an account and an as-of-date, e.g., by selecting the account and the as-of-date on a statement page 601 at the client portal 140. The client portal 140 then submits the document request to the cloud connector 130.

The cloud connector may in turn initiate a get document flow at step 602, e.g., by selecting the external document provider (e.g., based on document characteristics such as PL and fund name) at step 603. The cloud connector 130 may then receive the BNYM adapter to get document at step 604. The cloud connector 130 may then request a document list from the external document provider providing the account and an as-of-date, at step 605. The cloud connector 130 may filter the returned document list down to the one entry with the correct as-of-date, e.g., at step 606. The cloud connector 130 may then request the document from the external document provider 145 based on the filtered results, e.g., at step 607 such that the cloud connector 130 may in turn return a document response with the given document content to the client portal 140. For example, the Base-64 encoded bytes of the document is returned to the Statements Page 601.

In another embodiment, if the client portal 140 fails to call the cloud connector 130, or the cloud connector 130 fails to find the external document provider 245, the call to the external document provider fails and the call to the response callback URL fails. The statement page 601 may be returned with a failure notification.

Figure 7:
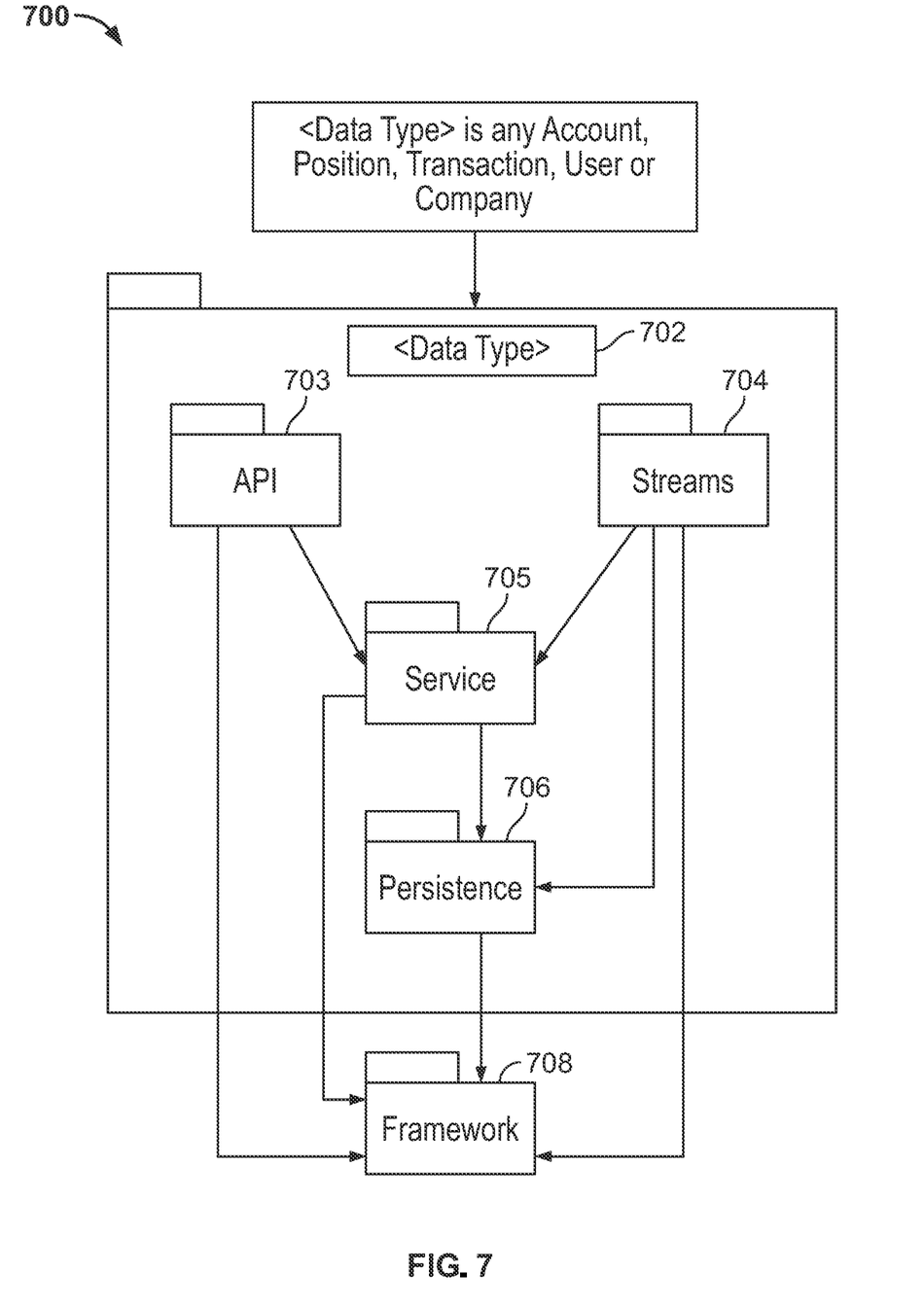
FIG. 7 is a simplified block diagram illustrating an example structure of the cloud connector, according to embodiments described herein.

FIG. 7 is a simplified block diagram illustrating an example structure 700 of the cloud connector, according to embodiments described herein. The cloud connector 130 may comprise the parent package structure 700 comprising an API 703, streams 704, services 705, and persistence 706, all of which contribute to the connector framework 708. For example, the package structure of API 703, streams 704, services 705, and persistence 706 may be defined based on a data type 702, which can comprise any account, position, transaction, user, company, or other financial information attribute.

The API 703 may be implemented by a Spring Boot controller application. Streams 704 may comprise a Spring Boot Kafka Streams application. Services 705 may serve as the business logic layer. Persistence 706 may serve as the persistence layer for the data sink of the framework 708.

Figure 8A:
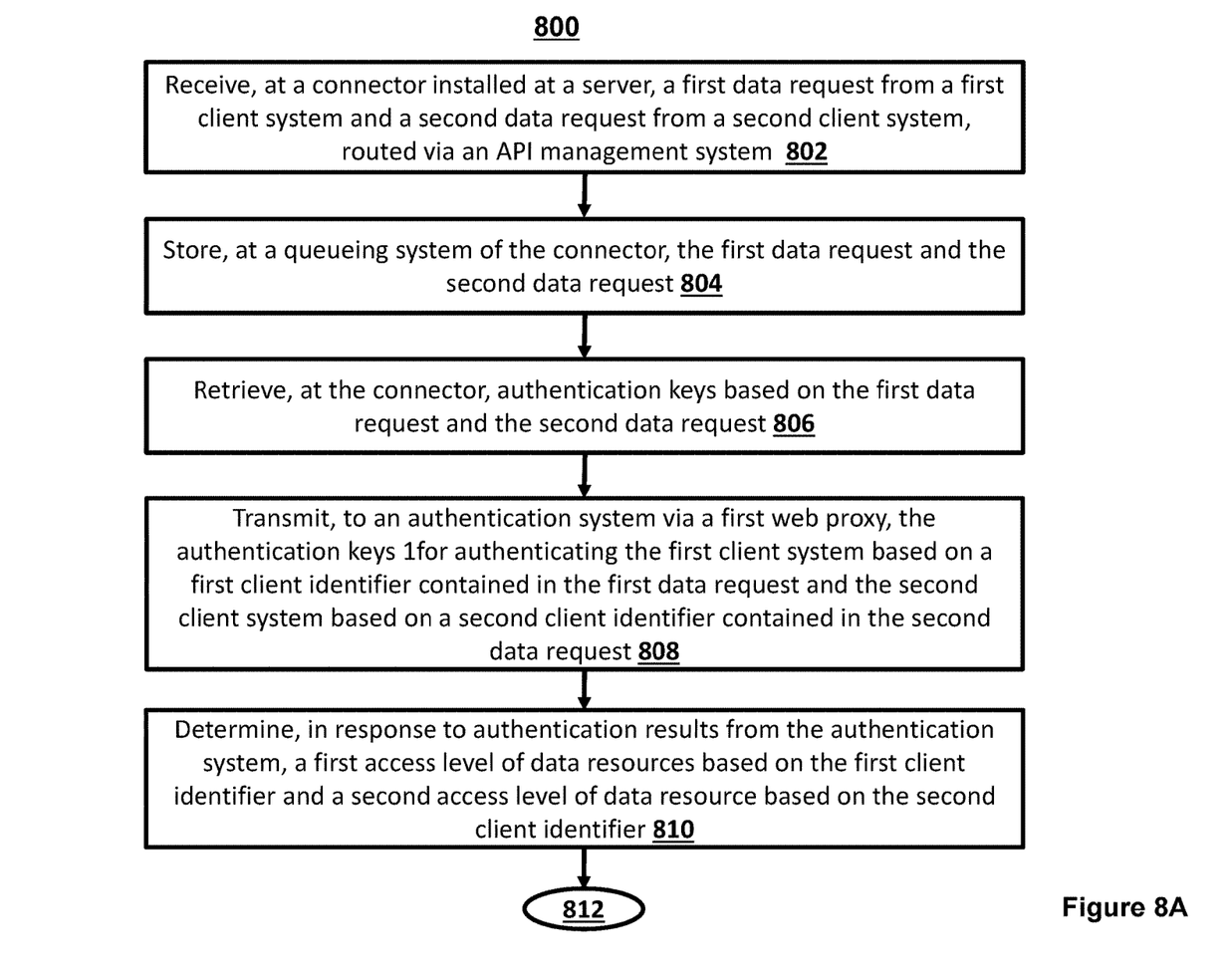
FIGS. 8A and 8B is a simplified logic flow diagram illustrating a method of integrating client data and service via the cloud connector at a multi-tenant server, according to embodiments described herein.
Figure 8B:
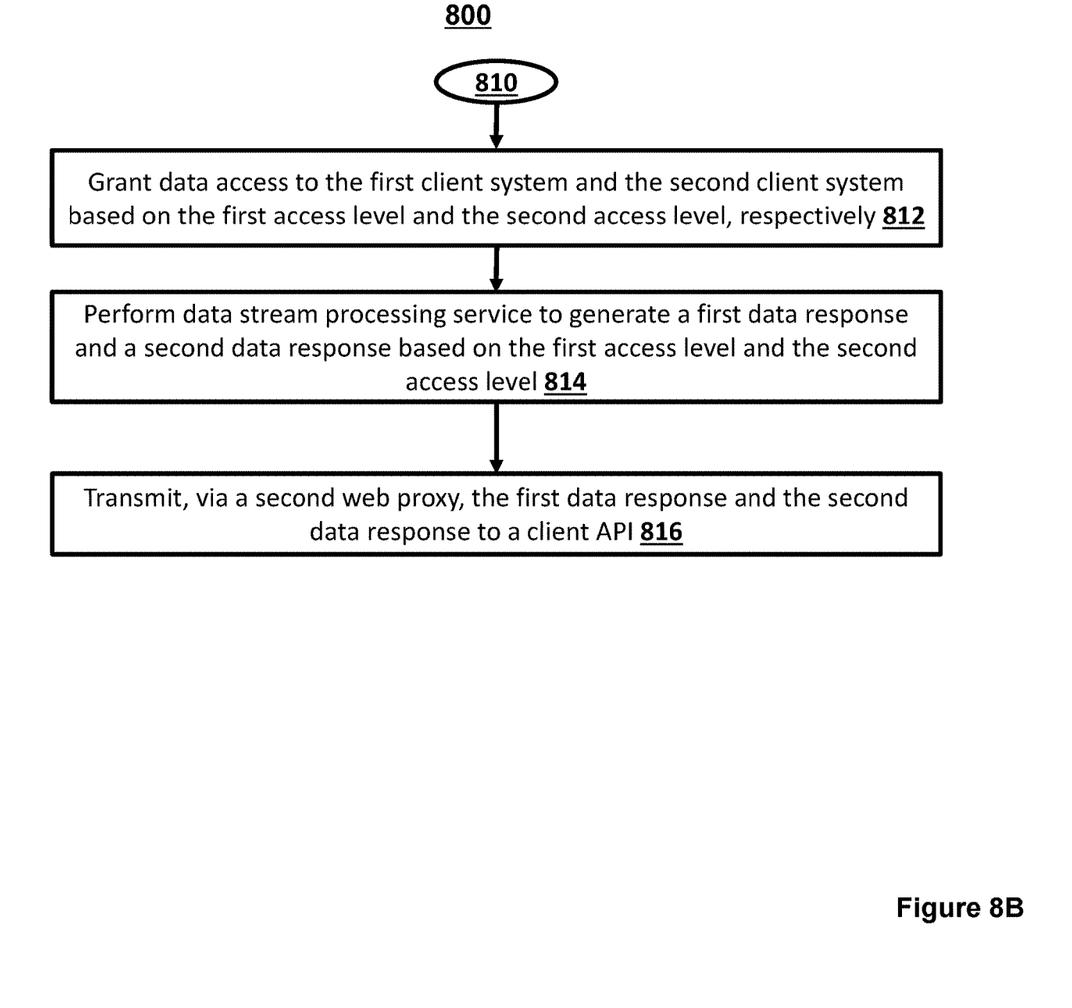

FIGS. 8A and 8B is a simplified logic flow diagram illustrating a method 800 of integrating client data and service via the cloud connector at a multi-tenant server, according to embodiments described herein. One or more of the processes of method 800 may be implemented, at least in part, in the form of executable code stored on non-transitory, tangible, machine-readable media that when run by one or more processors may cause the one or more processors to perform one or more of the processes. In some embodiments, method 800 corresponds to the operation of the cloud connector module 130 (e.g., FIGS. 1-2).

At step 802, a connector (e.g., 130 in FIG. 1) installed at a server (e.g., 120 in FIG. 1) may receive data requests from one or more client systems (e.g., 102 in FIG. 1), e.g., a first data request from a first client system and a second data request from a second client system. The first data request and the second data request are routed via an application programming interface (API) management system (e.g., 105 in FIG. 1). For example, the data request comprises any of a synchronization request; a data processing exception request; an out-of-order record handling request; and a data processing throughput control request.

In one implementation, the connector includes any combination of an API, a stream application, a service layer, and a persistence layer, as shown in FIG. 7.

In one implementation, the first data request comprises a request for a document based on a user account and a date submitted via a user portal. In that case, the connector may determine an external document provider based on a fund identifier and send a document request to the external document provider based on an account name and the date. The connector may further filter a returned document list down to at least one entry with a correct date and stream the filtered returned document list in real-time.

In one implementation, the first data request comprises a request to place a trading order to an external trading system. In that case, the connector may determine a service provider based on attributes of the trading order and transmit a call for a web API by the service provider to place the order. The connector may then return an order submission status to a client portal.

At step 804, a queueing system of the connector may store the first data request and the second data request. For example, a number of data requests may be received from a plurality of clients, and the queueing system of the connector may store the number of data requests. The number of data requests are thus processed via asynchronous calls.

At step 806, the connector (e.g., 130 in FIG. 1) may retrieve authentication keys based on the first data request and the second data request.

At step 808, the connector may transmit to an authentication system (e.g., 108 in FIG. 1) via a first web proxy, the authentication keys for authenticating the first client system based on a first client identifier contained in the first data request and the second client system based on a second client identifier contained in the second data request.

In some scenarios, the connector may determine that the first data request or the second data request has not been associated with a user profile stored at the server and may process the first data request or the second data request while creating the user profile at the server for authentication.

At step 810, the connector may determine, in response to authentication results from the authentication system, a first access level of data resources based on the first client identifier and a second access level of data resource based on the second client identifier. The first access level and the second access level are different. For example, the first client system or the second client system synchronizes data and/or workflow states by access respective data resources depending on respective access level.

At step 812, the connector may then grant data access to the first client system and the second client system based on the first access level and the second access level, respectively.

At step 814, the connector may perform data stream processing service to generate a first data response and a second data response based on the first access level and the second access level.

At step 816, the data connector may transmit, via a second web proxy (e.g., 110 b in FIG. 1), the first data response and the second data response to a client API.

Figure 9:
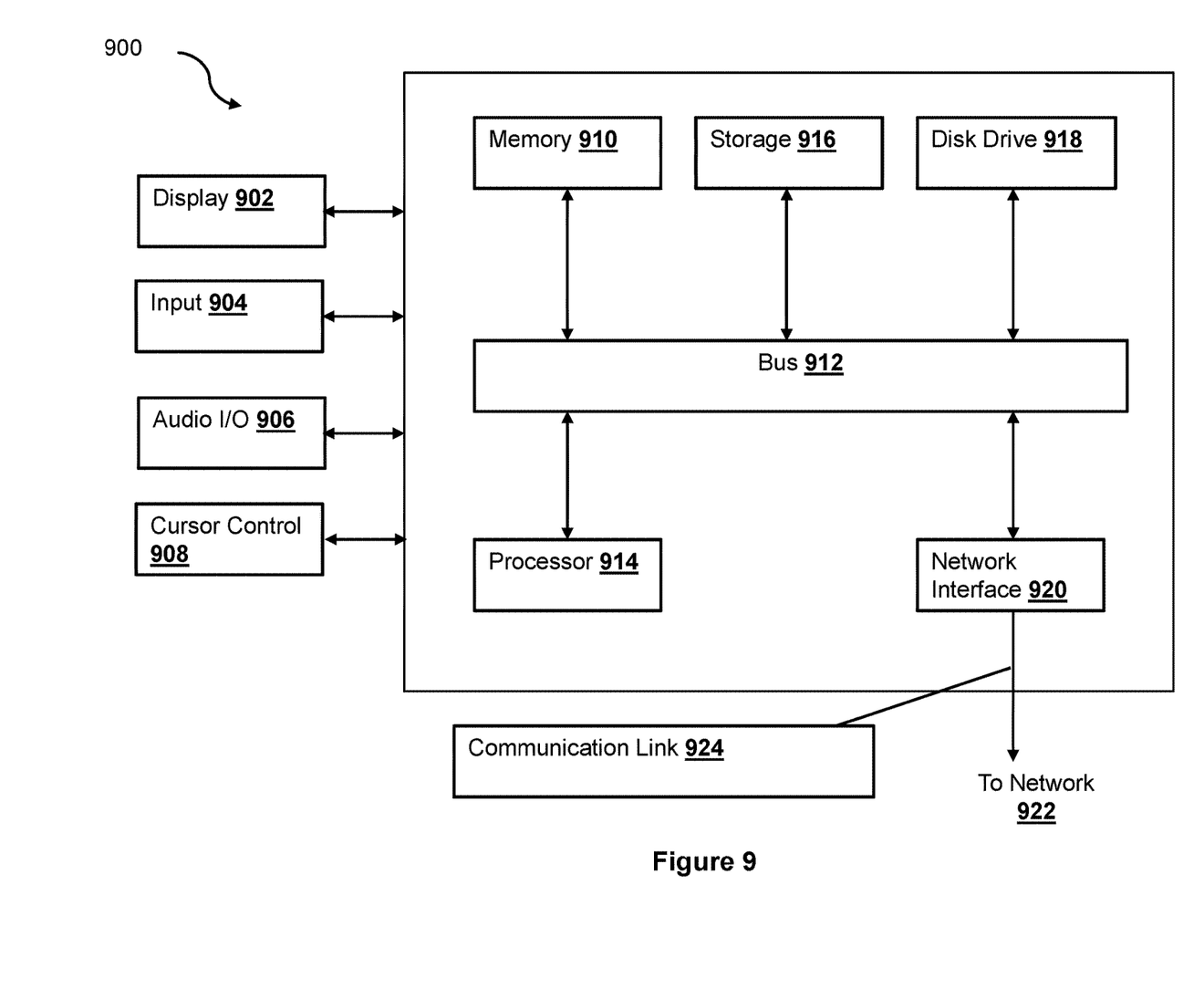
FIG. 9 is a block diagram illustrating example components of a computing system for implementing embodiments described in FIGS. 1-8, according to one embodiment.

FIG. 9 is a block diagram illustrating example components of a computing system 900 for implementing embodiments described in FIGS. 1-8, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 900 in a manner as follows.

The computer system 900 includes a bus 912 or other communication mechanism for communicating information data, signals, and information between various components of the computer system 900. The components include an input/output (I/O) component 904 that processes a user (i.e., sender, recipient, service provider) action, such as selecting keys from a keypad/keyboard, selecting one or more buttons or links, etc., and sends a corresponding signal to the bus 912. The I/O component 904 may also include an output component, such as a display 902 and a cursor control 908 (such as a keyboard, keypad, mouse, etc.). The display 902 may be configured to present a login page for logging into a user account or a checkout page for purchasing an item from a merchant. An optional audio input/output component 906 may also be included to allow a user to use voice for inputting information by converting audio signals. The audio I/O component 906 may allow the user to hear audio. A transceiver or network interface 920 transmits and receives signals between the computer system 900 and other devices, such as another user device, a merchant server, or a service provider server via a network 922, such as network 260 of FIG. 2. In one embodiment, the transmission is wireless, although other transmission mediums and methods may also be suitable. A processor 914, which can be a micro-controller, digital signal processor (DSP), or other processing component, processes these various signals, such as for display on the computer system 900 or transmission to other devices via a communication link 924. The processor 914 may also control transmission of information, such as cookies or IP addresses, to other devices.

The components of the computer system 900 also include a system memory component 910 (e.g., RAM), a static storage component 916 (e.g., ROM), and/or a disk drive 918 (e.g., a solid-state drive, a hard drive). The computer system 900 performs specific operations by the processor 914 and other components by executing one or more sequences of instructions contained in the system memory component 910. For example, the processor 914 can perform the position detection of webpage elements described herein according to the process 300.

Logic may be encoded in a computer readable medium, which may refer to any medium that participates in providing instructions to the processor 914 for execution. Such a medium may take many forms, including but not limited to, non-volatile media, volatile media, and transmission media. In various implementations, non-volatile media includes optical or magnetic disks, volatile media includes dynamic memory, such as the system memory component 910, and transmission media includes coaxial cables, copper wire, and fiber optics, including wires that comprise the bus 912. In one embodiment, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip, or cartridge, or any other medium from which a computer is adapted to read.

In various embodiments of the present disclosure, execution of instruction sequences to practice the present disclosure may be performed by the computer system 900. In various other embodiments of the present disclosure, a plurality of computer systems 900 coupled by the communication link 924 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A method for integrating client data and service via a single connector at a multi-tenant server, the method comprising:

receiving, at a connector installed at a server, a first data request from a first client system and a second data request from a second client system, wherein the first data request and the second data request are routed via an application programming interface (API) management system;

storing, at a queueing system of the connector, the first data request and the second data request;

retrieving, at the connector, authentication keys based on the first data request and the second data request;

transmitting, to an authentication system via a first web proxy, the authentication keys for authenticating the first client system based on a first client identifier contained in the first data request and the second client system based on a second client identifier contained in the second data request;

determining, in response to authentication results from the authentication system, a first access level of data resources based on the first client identifier and a second access level of data resource based on the second client identifier,
wherein the first access level and the second access level are different;

granting data access to the first client system and the second client system based on the first access level and the second access level, respectively;

performing a data stream processing service to generate a first data response and a second data response based on the first access level and the second access level; and transmitting, via a second web proxy, the first data response and the second data response to a client API.

2. The method of claim 1, wherein the first client system or the second client system synchronizes data and/or workflow states by accessing respective data resources depending on a respective access level.

3. The method of claim 1, further comprising:

receiving a plurality of data requests from a plurality of clients;

storing, at the queueing system of the connector, the plurality of data requests; and processing the plurality of data requests via asynchronous calls.

4. The method of claim 1, wherein the data request comprises any of:

a synchronization request;

a data processing exception request;

an out-of-order record handling request; and a data processing throughput control request.

5. The method of claim 1, wherein the connector includes any combination of an API, a stream application, a service layer and a persistence layer.

6. The method of claim 1, wherein the first data request comprises a request for a document based on a user account and a date submitted via a user portal, and the method further comprising:

determining an external document provider based on a fund identifier;

sending a document request to the external document provider based on an account name and the date;

filtering a returned document list down to at least one entry with a correct date; and streaming the filtered returned document list in real-time.

7. The method of claim 1, wherein the first data request comprises a request to place a trading order to an external trading system, and the method further comprising:

determining a service provider based on attributes of the trading order;

transmitting a call for a web API by the service provider to place the order; and
returning an order submission status to a client portal.

8. The method of claim 1, further comprising:
determining that the first data request or the second data request has not been associated with a user profile stored at the server; and
processing the first data request or the second data request while creating the user profile at the server.

9. A system for integrating client data and service via a single connector at a multi-tenant server, the system comprising:
a communication interface receiving, at a connector installed at a server, a first data request from a first client system and a second data request from a second client system, wherein the first data request and the second data request are routed via an application programming interface (API) management system;
a memory comprising a queueing system at the connector which stores the first data request and the second data request, wherein the memory further stores a plurality of processor-executable instructions; and
one or more hardware processors reading and executing the plurality of processor-executable instructions to perform operations comprising:
retrieving, at the connector, authentication keys based on the first data request and the second data request;
transmitting, to an authentication system via a first web proxy, the authentication keys for authenticating the first client system based on a first client identifier contained in the first data request and the second client system based on a second client identifier contained in the second data request;
determining, in response to authentication results from the authentication system, a first access level of data resources based on the first client identifier and a second access level of data resource based on the second client identifier,
wherein the first access level and the second access level are different;
granting data access to the first client system and the second client system based on the first access level and the second access level, respectively;
performing a data stream processing service;
generating, based on the performing, a first data response and a second data response based on the first access level and the second access level; and
transmitting, via a second web proxy, the first data response and the second data response to a client API.

10. The system of claim 9, wherein the first client system or the second client system synchronizes data and/or workflow states by access respective data resources depending on respective access level.

11. The system of claim 9, wherein the operations further comprise:
receiving a plurality of data requests from a plurality of clients;
storing, at the queueing system of the connector, the plurality of data requests; and
processing the plurality of data requests via asynchronous calls.

12. The system of claim 9, wherein the data request comprises any of:
a synchronization request;
a data processing exception request;
an out-of-order record handling request; and
a data processing throughput control request.

13. The system of claim 9, wherein the connector includes any combination of an API, a stream application, a service layer and a persistence layer.

14. The system of claim 9, wherein the first data request comprises a request for a document based on a user account and a date submitted via a user portal, and the operations further comprising:
determining an external document provider based on a fund identifier;
sending a document request to the external document provider based on an account name and the date;
filtering a returned document list down to at least one entry with a correct date; and
streaming the filtered returned document list in real-time.

15. The system of claim 9, wherein the first data request comprises a request to place a trading order to an external trading system, and the operations further comprising:
determining a service provider based on attributes of the trading order;
transmitting a call for a web API by the service provider to place the order; and
returning an order submission status to a client portal.

16. The system of claim 9, wherein the operations further comprise:
determining that the first data request or the second data request has not been associated with a user profile stored at the server; and
processing the first data request or the second data request while creating the user profile at the server.

17. A non-transitory processor-readable storage medium storing a plurality of processor-executable instructions for integrating client data and service via a single connector at a multi-tenant server, the instructions being executed by one or more hardware processors to perform operations comprising:
receiving, at a connector installed at a server, a first data request from a first client system and a second data request from a second client system, wherein the first data request and the second data request are routed via an application programming interface (API) management system;
storing, at a queueing system of the connector, the first data request and the second data request;
retrieving, at the connector, authentication keys based on the first data request and the second data request;
transmitting, to an authentication system via a first web proxy, the authentication keys for authenticating the first client system based on a first client identifier contained in the first data request and the second client system based on a second client identifier contained in the second data request;
determining, in response to authentication results from the authentication system, a first access level of data resources based on the first client identifier and a second access level of data resource based on the second client identifier,
wherein the first access level and the second access level are different;
granting data access to the first client system and the second client system based on the first access level and the second access level, respectively;
generating a first data response and a second data response based on the first access level and the second access level based on performing a data stream processing service; and transmitting, via a second web proxy, the first data response and the second data response to a client API.

18. The non-transitory processor-readable storage medium of claim 17, wherein the first client system or the second client system synchronizes data and/or workflow states by access respective data resources depending on respective access level.

19. The non-transitory processor-readable storage medium of claim 17, wherein the operations further comprise:
   receiving a number of data requests from a plurality of clients;
   storing, at the queueing system of the connector, the number of data requests; and
   processing the number of data requests via asynchronous calls.

20. The non-transitory processor-readable storage medium of claim 17, wherein the first data request comprises a request for a document based on a user account and a date submitted via a user portal, and the operations further comprising:
   determining an external document provider based on a fund identifier;
   sending a document request to the external document provider based on an account name and the date;
   filtering a returned document list down to at least one entry with a correct date; and
   streaming the filtered returned document list in real-time.

* * * * *